United States Patent
Roessle

[19]

[11] Patent Number: 5,983,188
[45] Date of Patent: Nov. 9, 1999

[54] PROCESS AND DEVICE FOR LIMITING THE SPEED OF A MOTOR VEHICLE

[76] Inventor: Manfred Roessle, Burgstrasse 2, D-71640, Ludwigsburg, Germany

[21] Appl. No.: 08/809,707

[22] PCT Filed: Oct. 4, 1995

[86] PCT No.: PCT/EP95/03905

§ 371 Date: Apr. 4, 1997

§ 102(e) Date: Apr. 4, 1997

[87] PCT Pub. No.: WO96/11122

PCT Pub. Date: Apr. 18, 1996

[30] Foreign Application Priority Data

Oct. 6, 1994 [DE] Germany ............................. 44 35 705

[51] Int. Cl.⁶ ...................................................... G10L 5/06
[52] U.S. Cl. .................. 704/275; 704/273; 364/426.041; 364/460
[58] Field of Search ...................... 704/270, 275, 704/246, 261; 180/179, 178, 170; 701/93, 110, 97; 364/426.041, 460

[56] References Cited

U.S. PATENT DOCUMENTS

| | | | |
|---|---|---|---|
| 4,401,852 | 8/1983 | Noso et al. ............................. | 704/275 |
| 4,501,012 | 2/1985 | Kishi et al. ............................. | 704/275 |
| 4,506,378 | 3/1985 | Noso et al. ............................. | 704/275 |
| 4,797,924 | 1/1989 | Schnars et al. ......................... | 704/270 |
| 4,862,363 | 8/1989 | Krisher et al. ....................... | 364/424.1 |
| 5,450,525 | 9/1995 | Russell et al. .......................... | 704/275 |
| 5,592,385 | 1/1997 | Katayama et al. ............... | 364/426.041 |

*Primary Examiner*—David R. Hudspeth
*Assistant Examiner*—Vijay B. Chawan
*Attorney, Agent, or Firm*—Foley & Lardner

[57] ABSTRACT

An apparatus and method for limiting a vehicle speed based on voice inputs includes a sound recorder that receives a voice input. A first signal generator receives a vehicle speed sensor value, and outputs a vehicle speed signal. A signal memory receives the signals provided by the sound recorder and the first signal generator, and stores them as a pair of values upon receiving a store signal from a memory key. A first comparator compares the stored voice signal with a current voice signal output by the sound recorder, compares them, and outputs a coincidence signal based on the comparison. A second comparator compares the stored speed signal and a current speed signal received provided by the first signal generator, compares them, and outputs a difference signal. Based on the coincidence signal and the difference signal, the vehicle's speed is regulated so as not to exceed the stored speed signal.

20 Claims, 6 Drawing Sheets

PROCESS AND DEVICE FOR LIMITING THE SPEED OF A MOTOR VEHICLE

1. FIELD OF THE INVENTION

The present invention is directed to limiting the speed of an automobile via voice-activated control.

2. DESCRIPTION OF THE RELATED ART

When an automobile is being driven, above all in built-up areas, very severe demands are made of the vehicle driver. He must constantly observe the traffic situation and be aware of rapid changes to which he must adapt his driving behavior. In addition, he has to pay attention to traffic symbols and signboards, and this may be very difficult, above all in strange districts, especially when he also has to recognize and comply with road signs as well. Finally, the vehicle driver should also comply with the general speed limit and, where appropriate, speed limits differing from this and even changing frequently, and he should operate his vehicle accordingly, without causing a traffic obstruction by driving too slowly.

SUMMARY OF THE INVENTION

The object on which the invention is based is to make it easier for the vehicle driver at least to adhere to the speed limit applicable in each case.

This object is achieved by a method for limiting the speed of an automobile. The method includes the steps of, during a preparatory phase: a) during driving at a selected speed, a voice signal corresponding to the selected speed signal is uttered, b) the voice signal is converted into a primary electronic voice value signal by means of a sound recorder, and c) a speed signal corresponding to the selected speed is generated as a limit value signal by a signal converter. Both the primary voice value signal and the limit value signal are stored in relation to one another as a pair of signals in a signal memory by actuating a memory key. The method also includes the steps of, for speed limitation during travel, a) a voice signal corresponding to the selected limit signal is uttered, b) this voice signal is converted into a secondary voice value signal by means of the sound recorder, c) the secondary voice value signal is supplied to a control device and is compared in a first comparator with the primary voice value signal, and, if the two voice value signals coincide, a coincidence signal is generated. If there is a coincidence, the limit value signal is compared in a second comparator with the actual speed signal corresponding to the speed in operation and a difference signal is formed from it, and, in the event of a negative difference signal, an actuating signal is generated, by means of which a regulator reducing the supply of energy to the engine is actuated.

The method may further include, in the preparatory phase, a) during driving at a plurality of selected speeds, a voice signal is uttered corresponding to the selected speed in each case, b) each voice signal is converted into a primary electronic voice value signal by means of a sound recorder, and c) a speed signal corresponding to the selected speed in each case stored in relation to one another as a pair of signals in a signal memory by actuating a memory key.

The memory may further include the step of generating, by a manually actuable signal generator, the selected limit value signals on the basis of a manual setting.

The method may further include the step of, when the memory key is actuated for storing the respective pair of signals, an inactivating signal is generated which temporarily inactivates the comparators of the control device.

The method may further include the steps of, a) at the start of the preparatory phase, a setting switch is set to the 'storage' position, as a result of which the signal lines to the comparators of the control device are interrupted, and b) after the conclusion of the preparatory phase, the setting switch is changed over to 'operation' position again.

The method may further include the step of, when the memory key is actuated for storing the respective pair of signals, the primary voice value signal is at the same time also stored in a separate memory and is transmitted from this memory to the control device as a secondary voice value signal only after the release of the memory key.

The method may further include the steps of, a) by means of the secondary voice value signal or by means of the coincidence signal triggered by it, a safety signal is generated, which triggers an actuating signal, by means of which the regulator influencing the supply of energy to the engine is actuated in the direction of a reduction in the energy supply, b) before or after the utterance of the voice signal corresponding to the selected speed, the accelerator pedal of the vehicle is released in the direction of the idling position, and, shortly before or when the idling position is reached, a signal generator coupled to the accelerator pedal generates a release signal which is supplied to the control device and which cancels the effect of the safety signal there.

The method may further include the steps of, in the preparatory phase, a) an enabling voice signal is uttered, b) this voice signal is converted into an enabling signal by means of the sound recorder, c) this signal is stored as a primary enabling signal, together with a speed signal corresponding to the highest possible vehicle speed or a vehicle speed above this, in the signal memory as a pair of signals by actuating a separate memory key. The method also includes the steps of, for speed limitation during travel, a) the enabling voice signal is uttered in order to change the speed limit, b) this signal is converted into a secondary enabling signal by means of the sound recorder, c) this secondary enabling signal is supplied to the control device and is compared in a comparator with the primary enabling signal and, if the two signals coincide, a second coincidence signal is generated. The effect of the first coincidence signal is canceled in the control device by means of the second coincidence signal.

The method may further include the steps of a) an external control signal emitted by a stationary signal transmitter is received by means of a reception device, b) the external control signal is both processed to form a limit value signal which is supplied to the second comparator with priority over another limit value signal, c) and the external control signal is processed to form a coincidence signal which activates the second comparator in order to form a difference signal.

The above-mentioned object may also be achieved by an apparatus for limiting the speed of an automobile, where the apparatus includes a sound recorder, by means of which selected voice signals can be converted into corresponding voice value signals. The apparatus also includes a first signal generator, by means of which a speed signal corresponding to the speed of the automobile can be generated. The apparatus further includes a signal memory which has two signal inputs. When the signal memory is activated, the signal present at one signal input and the signal present at the other signal input can be stored in relation to one another as a pair of signals. The sound recorder is connected to one signal input of the signal memory, and the first signal generator is connected to the other signal input. The apparatus still further includes a memory key for generating a memory signal, by means of which the signal memory can be activated for the purpose of storing a pair of signals consisting of the voice value signal, present at its first signal input, as a primary voice value signal and of the speed signal, present at its second signal input, as a limit signal. The apparatus also includes a control device with a first comparator, by means of which a secondary voice value signal generated from a selected voice signal voice signal by the sound recorder can be compared with the primary voice value signal stored in the signal memory, and by means of which, when the voice value signals compared with each other coincide, a coincidence signal can be generated. The control device also includes a second comparator, by means of which the current speed signal generated by the first signal generator can be compared as an actual speed signal with the limit value signal stored in the signal memory, and by means of which, if there is a coincidence signal from the first comparator, a difference signal can be generated from the two speed signals compared with one another. In the event of a negative difference signal, an actuating signal can be generated by means of the control device. The apparatus also includes a regulator for reducing the supply of energy to the engine of the automobile when an actuating signal from control device occurs.

The signal memory may include memory locations for storing a plurality of pairs of signals which can be stored in succession when the memory key is actuated repeatedly.

The apparatus may also include a safety device, by means of which an individual pair of signals or a group of signals can be selectively protected against erasure or overwriting.

The apparatus may also include a manually actuable signal generator, by means of which it is possible to generate individually settable speed signals or retrieve predetermined speed signals which can be supplied as limit value signals to the second memory input of the signal memory.

BRIEF DESCRIPTION OF THE DRAWINGS

The above-mentioned objects and advantages of the invention will become more fully apparent from the following detailed description when read in conjunction with the accompanying drawings, with like reference numerals indicating corresponding parts throughout, and wherein.

DETAILED DESCRIPTION

Figure 1:
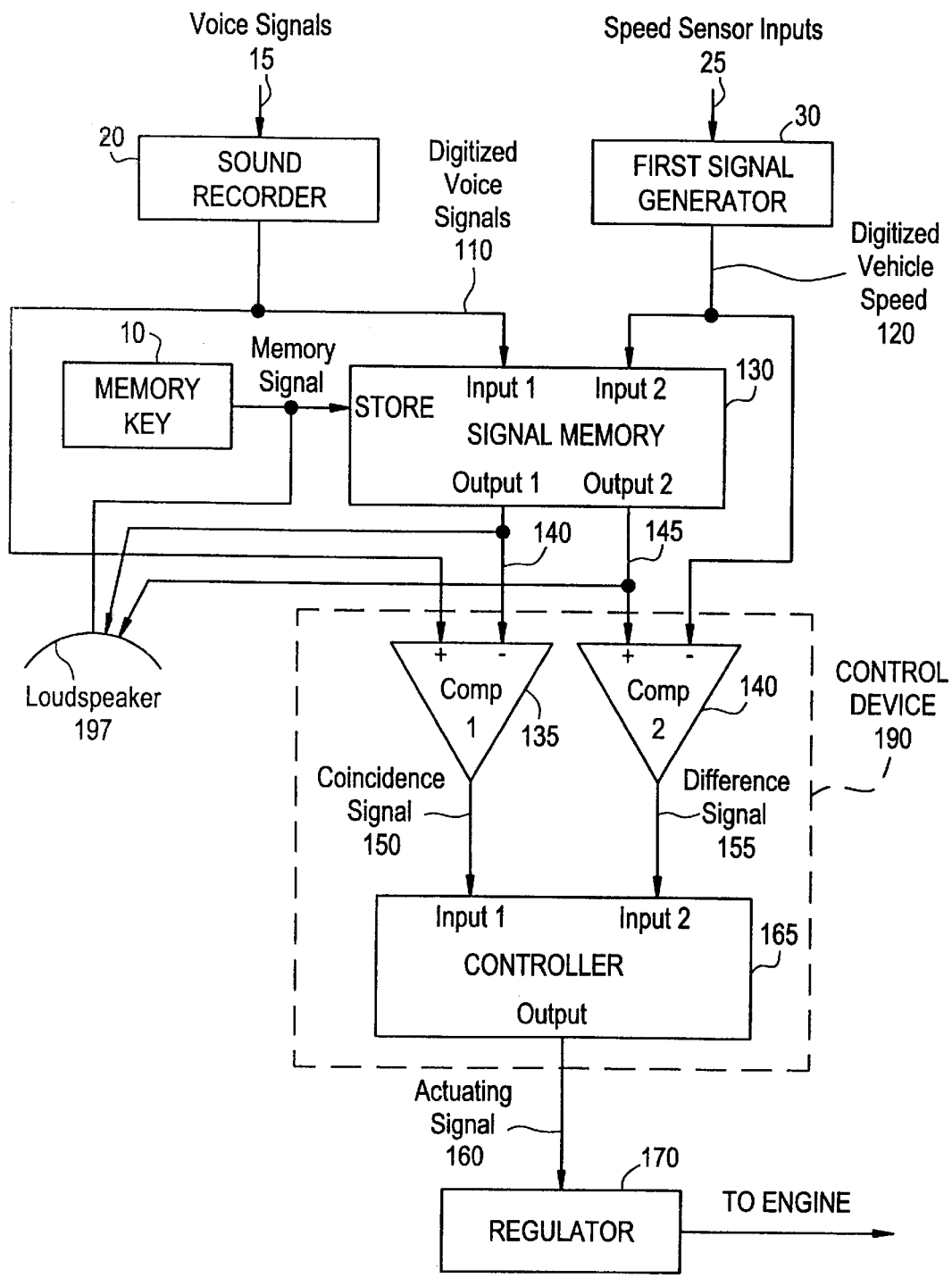
FIG. 1 is a block diagram of an apparatus according to one embodiment of the invention.
Figure 2:
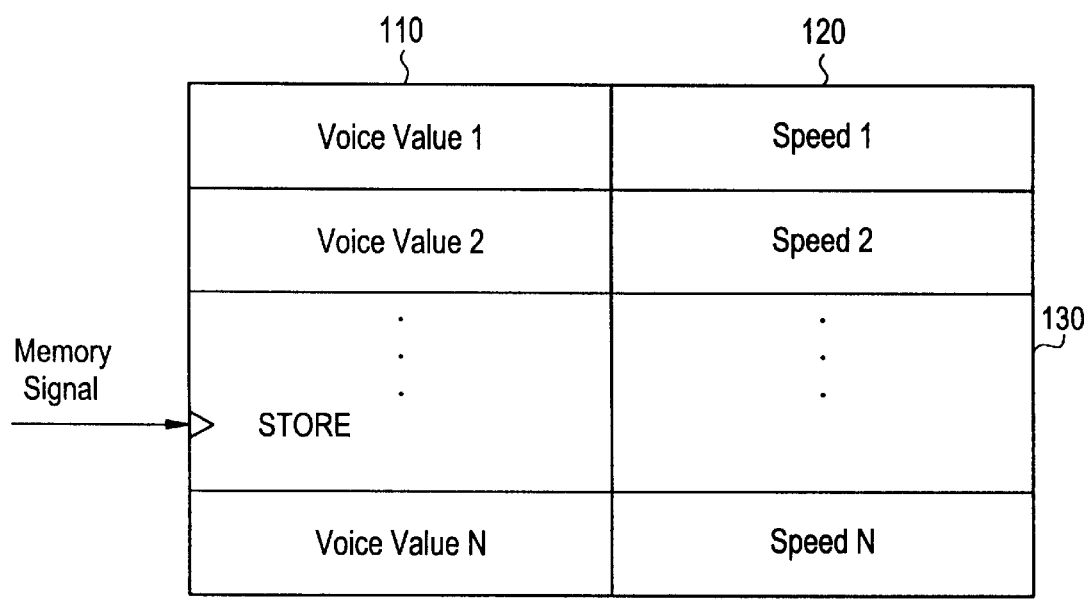
FIG. 2 is a diagram of the signal memory according to the invention.

Referring now to FIG. 1, when a vehicle driver wants to set the apparatus according to the invention to the speed limit applicable to the intended stretch of road, he brings his automobile to the relevant speed in a preparatory phase, actuates a memory key 10 of the apparatus and, in the meantime, utters a voice signal 15 corresponding to the speed limit. This voice signal is converted by a sound recorder 20 into a corresponding voice value signal 110. A corresponding speed signal 120 is generated from a speed sensor input 25 as a limit value signal by a signal converter 30 for the driving speed. The two signals 110, 120 are stored as a mutually assigned pair of signals in a signal memory 130 of the apparatus by actuating the memory key 10, as seen in FIGS. 1 and 2. When the vehicle driver then wants to enlist the aid of the apparatus, he utters the voice signal 15 which corresponds to the limit speed and which he has already uttered previously for storage. A secondary voice value signal 110 generated from this by the sound recorder is compared, in the apparatus, with the stored primary voice value signal 140 by a first comparator 135 which, if the signals 110, 140 coincide, generates a coincidence signal 150. If there is coincidence between the voice value signals, a second comparator 140 compares the stored limit value signal 145 with the speed signal 120 constantly supplied by the signal converter 30, that is to say with the signal representing the actual speed of the automobile, and forms a difference signal 155 from it. In the case of a negative difference signal, that is to say at a current vehicle speed which is above the limit speed, an actuating signal is generated 160 by a controller 165, by means of which a regulator 170 is actuated which reduces the supply of energy to the engine of the automobile until the actual speed of the automobile is no longer higher than the limit speed. This takes place irrespective of whether the vehicle driver deliberately himself reduces the speed of the automobile to a value no higher than the limit speed by a corresponding actuation of the accelerator pedal. As seen in FIG. 1, a control device 190 for controlling speed of the automobile includes the first comparator 135, the second comparator 140, and the controller 165. Since the apparatus takes effect constantly, even an intentional or unintentional more pronounced actuation of the accelerator pedal does not lead to an increase in the driving speed above the entered limit speed. Below this limit speed, the vehicle driver can select the actual speed of his automobile by depression or release of the accelerator pedal.

Advantageous embodiments of the invention are explained below.

A second embodiment of the apparatus according to the invention makes it possible, in a preparatory phase, to store a plurality of speed values as limit speeds, specifically, in each case, together with the associated voice value signal. As a result, if required, a plurality of different limit speeds may be set, without the stored pair of signals having to be modified for each individual case. FIG. 2 shows a plurality of pairs of signals being stored in the signal memory 130. These plurality of pairs of signals are stored in the signal memory upon successive actuation of the memory key 10, which provides a read enable signal to the signal memory 130 upon each actuation. This also makes it easier, after a relatively low limit speed, to change over readily to a higher limit speed, or vice versa. Due to the greater number of memory locations for pairs of signals, it is also possible that a plurality of different persons using the automobile occasionally or constantly can store their own voice value signals, together with the associated limit speeds, and, in the event of a change of driver, utilize them without further preparatory effort. The apparatus according to a third embodiment of the invention includes a safety device which prevents an individual stored pair of signals or an entire group of stored pairs of signals from being inadvertently erased or overwritten and, where possible, from initially remaining unnoticed and becoming recognizable only later and under unfavorable conditions.

The apparatus according to a fourth embodiment of the invention makes it possible to store the intended limit speeds, together with the corresponding voice value signals, simply by selection or retrieval. This is accomplished by way of a manually actuable signal generator, by means of which it is possible to generate individual settable speed signals or retrieve predetermined speed signals which can be supplied as limit value signals to a second memory input of the signal memory. These storage operations can thereby be carried out even when it is not possible or not desirable for the automobile in each case to be brought to the actual speed corresponding to the intended limit speed, so that the speed signal generated thereby can be stored as a limit value signal. These storage operations may even be carried out when the automobile is stationary. A further possibility for these storage operations is afforded by a development of the apparatus according to a fifth embodiment of the invention, in which a manually actuable signal generator is equipped with a signal memory for one speed signal or for a plurality of speed signals. The signal memory is preferably connected to a first signal generator and is provided with a memory key, by means of which the current speed signal of the first signal generator can be stored in the signal memory. Furthermore, the fifth embodiment includes a safety device for the signal memory of the manually actuable signal generator, in which an individual speed signal or a group of speed signals can be selectively protected against erasure or overwriting by way of the safety device.

Figure 3:
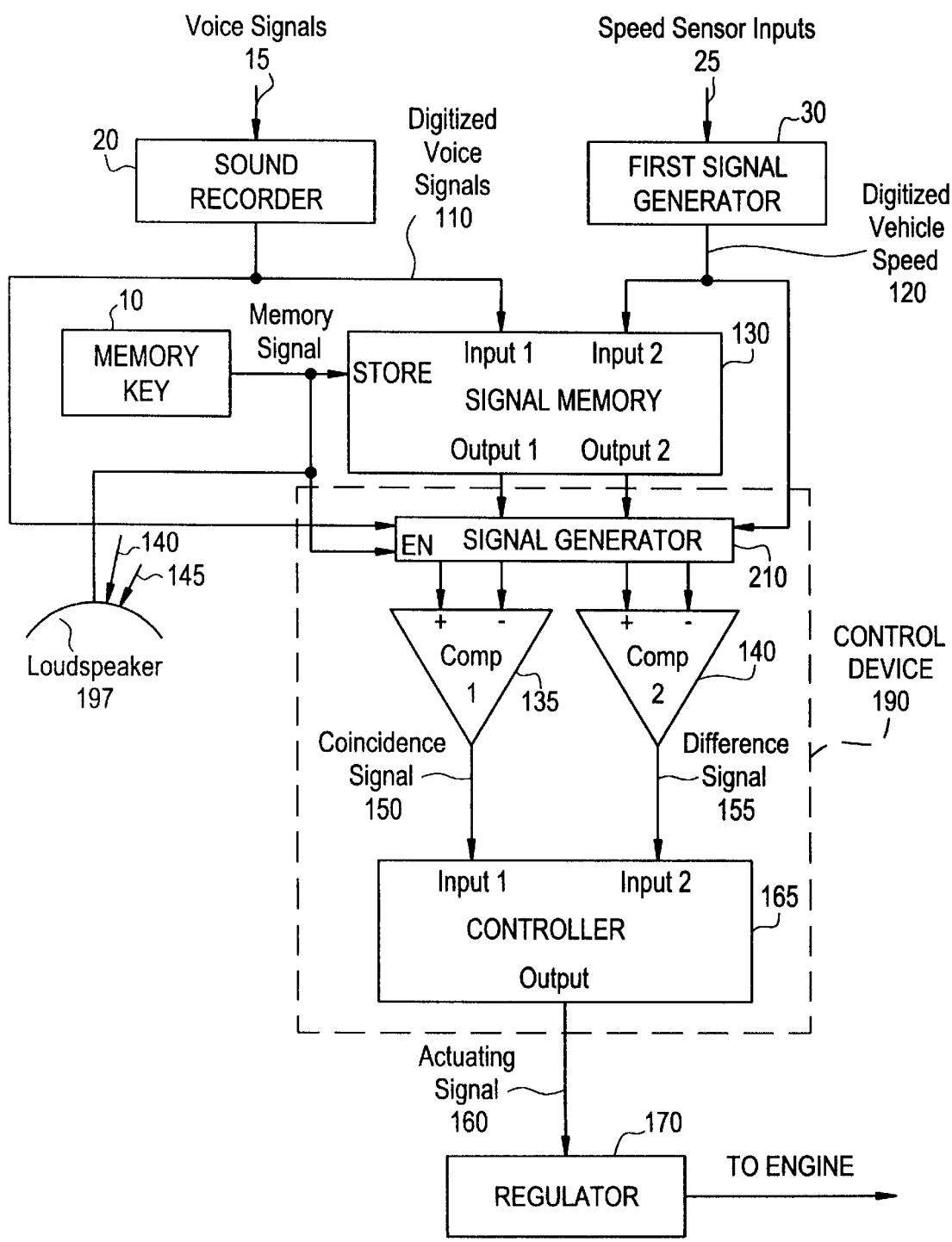
FIG. 3 is a block diagram of an apparatus according to another embodiment of the invention.
Figure 4:
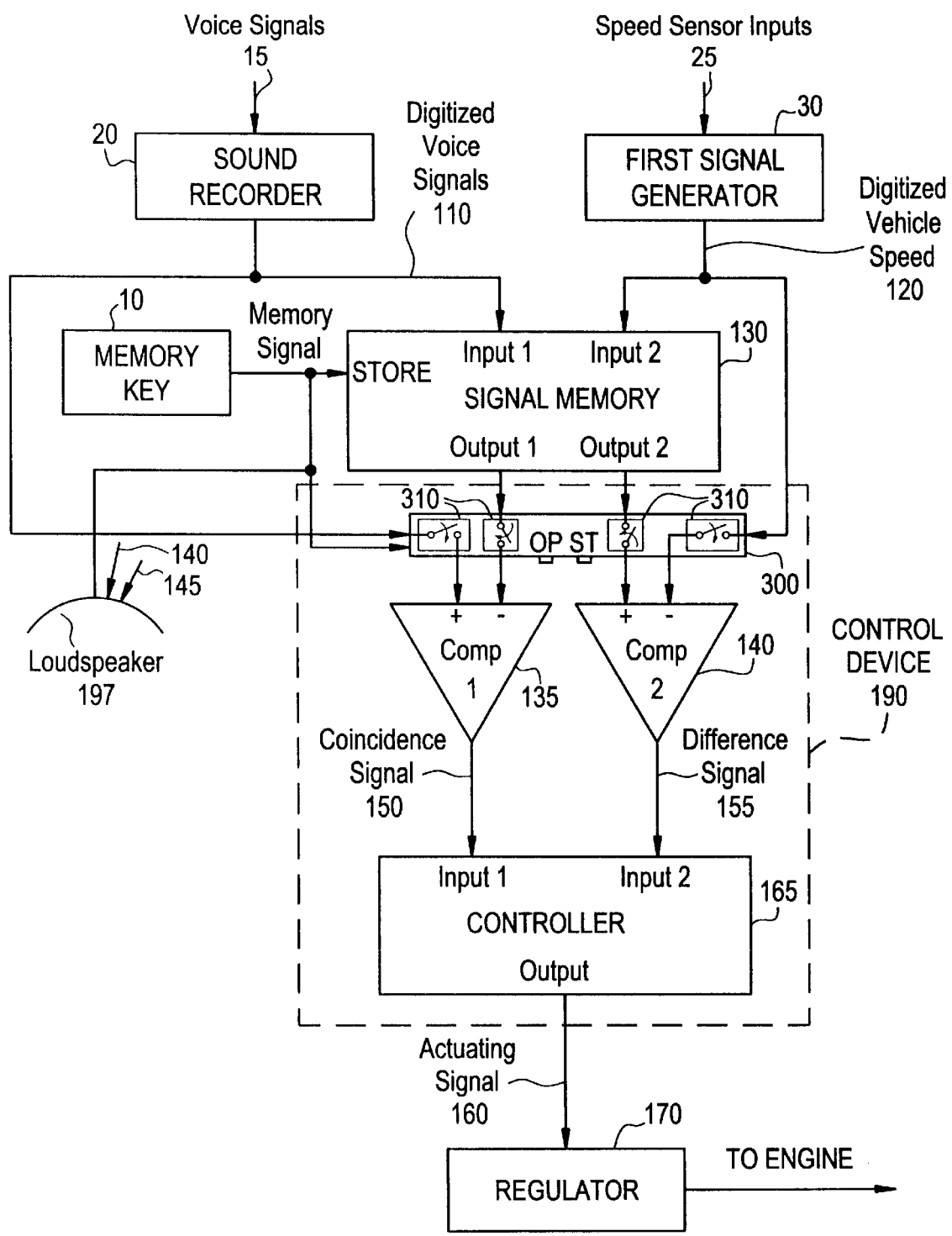
FIG. 4 is a block diagram of an apparatus according to still another embodiment of the invention.

The apparatus according to a sixth embodiment of the invention makes it possible to store a new pair of signals even during travel, without this storage operation causing the apparatus to act on the current driving state. This done by way of a signal generator for an inactivating signal, which his coupled to the memory key. In this embodiment, the control device includes a relay with normally closed contacts, with exciting windings of the relay being connected to the signal generator for an inactivating signal. The normally closed contacts are provided on the signal input lines of the comparators. By way of this embodiment, when the memory signal is provided to the signal memory 130, that memory signal 130 also is provided to the signal generator for an inactivating signal 210, which disallows any inputs from being provided to the comparators 135, 140, as shown in FIG. 3. The same is achieved by means of a seventh embodiment of the apparatus according to the invention. In the seventh embodiment, the apparatus includes a setting switch, which can be set to either a storage switch position or an operation switch position. The setting switch has switch members which are closed in the 'storage' switch position, and which are open in the 'operation' switch position. The switch members are provided on the signal input lines of the comparators 135, 140. Referring now to FIG. 4, when the setting switch 300 is set to 'storage' switch position, the comparators 135, 140 are prevented from acting on the signals provided on their respective input lines due to the switch members 310 being set to the open position. When the setting switch 300 is set to the 'operation' switch position, the comparators 135, 140 are allowed to act on the signals provided on their respective input lines due to the switch members 310 being set to the closed position. An eighth embodiment of the apparatus according to the invention ensures that, first, the intended storage operation takes place in due order and that only then is the apparatus activated according to the values of the pair of signals just entered. This is accomplished by way of a separate signal memory, the signal input of which is connected to the sound recorder 20 in parallel with one signal input of the first signal memory 130. The signal output of the separate signal memory is connected to the signal input of the first comparator 135. The separate signal memory is activated for signal reception by actuating the memory key 10 and is activated for signal transmission by releasing the memory key 10. That way, only when the memory key 10 is depressed can data be read into the separate signal memory.

An apparatus designed according to a ninth embodiment of the invention prevents the vehicle from being accelerated involuntarily during the retrieval of a limit speed which is above the actual speed, because the accelerator pedal is still in an actuating position corresponding to a speed which is above the limit speed previously in operation. In the ninth embodiment, there is provided a safety device, which is activated by way of a safety signal. The ninth embodiment includes a first signal generator for an actuating signal, by which the regulator is actuated for reducing the supply of energy to the engine of the automobile. The ninth embodiment includes a second signal generator which is coupled to the accelerator pedal of the automobile such that, when the accelerator pedal is released shortly before or when the idling position is reached, the second signal generator generates a release signal which cancels the effect of the safety signal and which inactivates the safety device again. Preferably, on the basis of a secondary voice value signal 110 or of a coincidence signal 150 output from the first comparator 135, a safety signal is generated, or one of these signals themselves can be utilized as a safety signal. By virtue of this design, the vehicle driver, when changing the limit speed, must first release the accelerator pedal. The vehicle driver is thereby made aware that he subsequently actuates the accelerator pedal deliberately only in the way corresponding to the current traffic situation and therefore does not accelerate the automobile involuntarily to the limit speed intended for a later stretch of road. With the apparatus according to a tenth embodiment of the invention, a separate signal generator for the actuating signal is saved. In this case, instead of a specific signal generator for an actuating signal, the respective signal generator of the control device is activated by way of the safety signal.

An eleventh embodiment of the apparatus according to the invention makes it possible to store an enabling signal in the same way as the limit value signals and to retrieve it acoustically, as required, and thereby cancel the speed limitation just cut in, if it is no longer desired and also if a higher limit value is not to be cut in. The eleventh embodiment includes a separate memory key, by which an enabling signal generated on the basis of an 'enabling' voice signal by the sound recorder 20 is stored, together with a special limit value signal, in the signal memory 130 as a pair of signals. A speed signal from all of the speed signals stored in the signal memory 130 (see FIG. 2) which corresponds to the highest possible speed of the automobile or to a speed above this, is utilized as the special limit value signal. The same is achieved by means of a twelfth embodiment of the apparatus according to the invention, in which an enabling key is actuated manually instead of the acoustic retrieval.

A thirteenth embodiment of the apparatus according to the invention makes it possible to check one or other or both of the signals just stored as to the correct signal content, both individually and in relation to one another, and also to check the storage operation itself. In the thirteenth embodiment, there is a playback device with a loudspeaker, which is activated temporarily, after a storage operation in the signal memory 130, by releasing the memory key 10. Note that, when the memory key 10 is pressed, the signal 130 is receiving data to store therein, and when the memory key 10 is released, the data that was just stored in the signal memory 130 is played out via the loudspeaker 197, as shown in FIG.

1, so that the driver can determine if the data was correctly written into the signal memory 130. A fourteenth embodiment according to the invention makes it possible to check the content of the signal memory 130, for example in order to ascertain whether the intended limit value signals are already present or are still present, and in order thereafter to make it possible to decide whether they have to be changed or have to be supplemented. This is accomplished by providing a memory key that can be set to a separate 'play-back' position, in which the playback device can be activated in order to play back the current voice signal (via the loudspeaker 197) or to indicate the current limit value signal. The same is achieved by a fifteenth embodiment according to the invention, which has a separate playback key, by which the playback device and/or indicator device is activated to playback the current voice signal or limit value signal.

Figure 5:
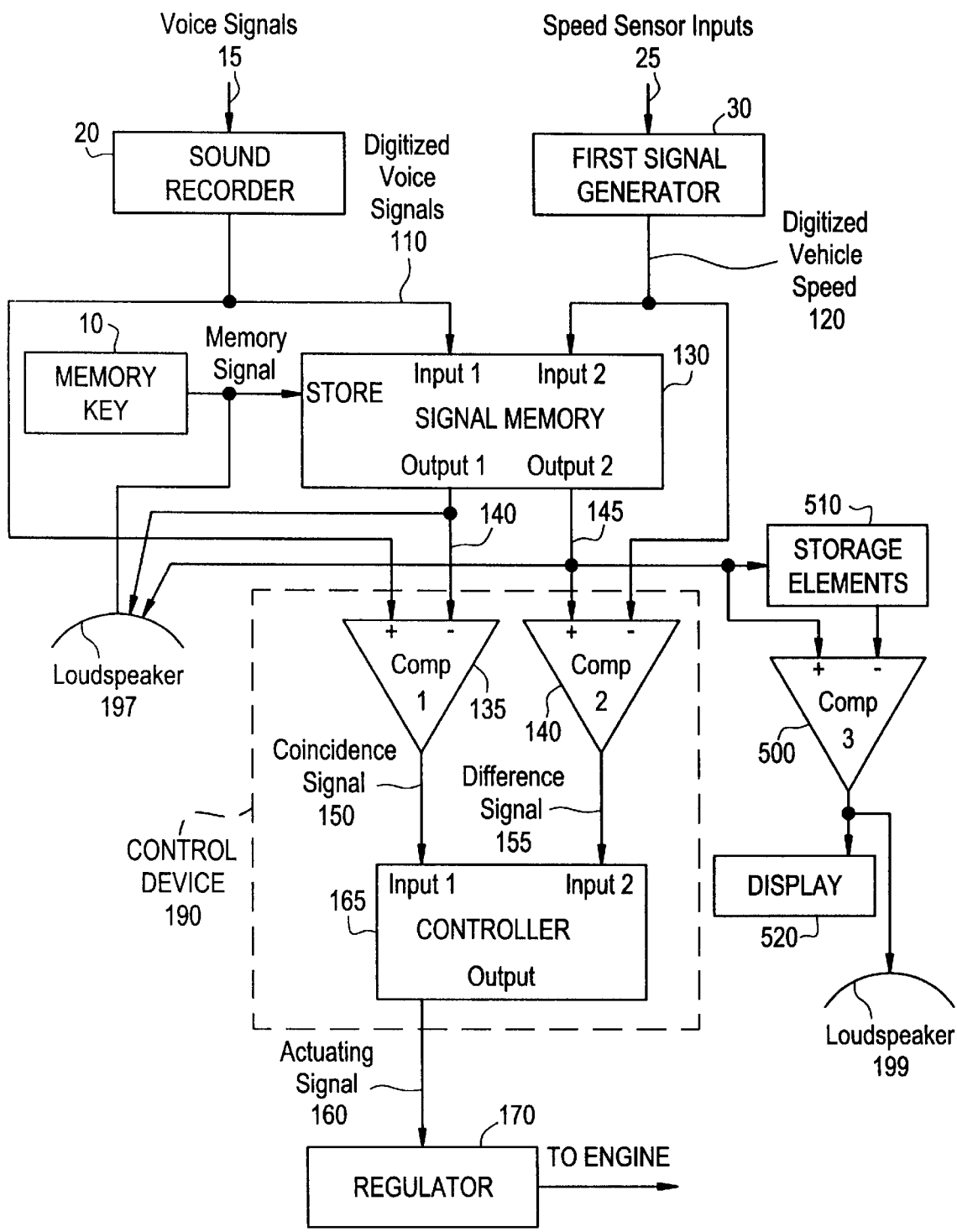
FIG. 5 is a block diagram of an apparatus according to yet another embodiment of the invention.

A sixteenth embodiment of the apparatus according to the invention gives the vehicle driver, in the event of a change from a higher limit speed to a lower limit speed, an acoustic and/or visual indication that the automobile is still moving in the speed range between the two limit speeds. This is achieved by way of a third comparator 500, as shown in FIG. 5. One signal input of the third comparator 500 receives a previous value on the signal line 145 (by way of a storage element 510, such as a latch or flip-flop or the like) that provides the current limit value signal, and the other signal input of the third comparator 500 receives a new limit value signal just retrieved by way of a corresponding voice signal, which is directly provided by way of signal line 145. In the event of a change from a higher limit speed to a lower limit speed, the playback device and/or indicator device is activated such that the new voice signal is repeated at short intervals via a loudspeaker 199 and/or the new limit value signal is indicated by flashing on a display 520 or the like, until the actual speed of the automobile is no longer higher than the new limit speed.

The storage of an enabling signal can also be checked by means of a seventeenth embodiment of the apparatus according to the invention, in which an enabling key enables the playback device and/or indicator device to playback a 'free' voice signal or to indicate a neutral speed statement such as '0 km'.

Figure 6:
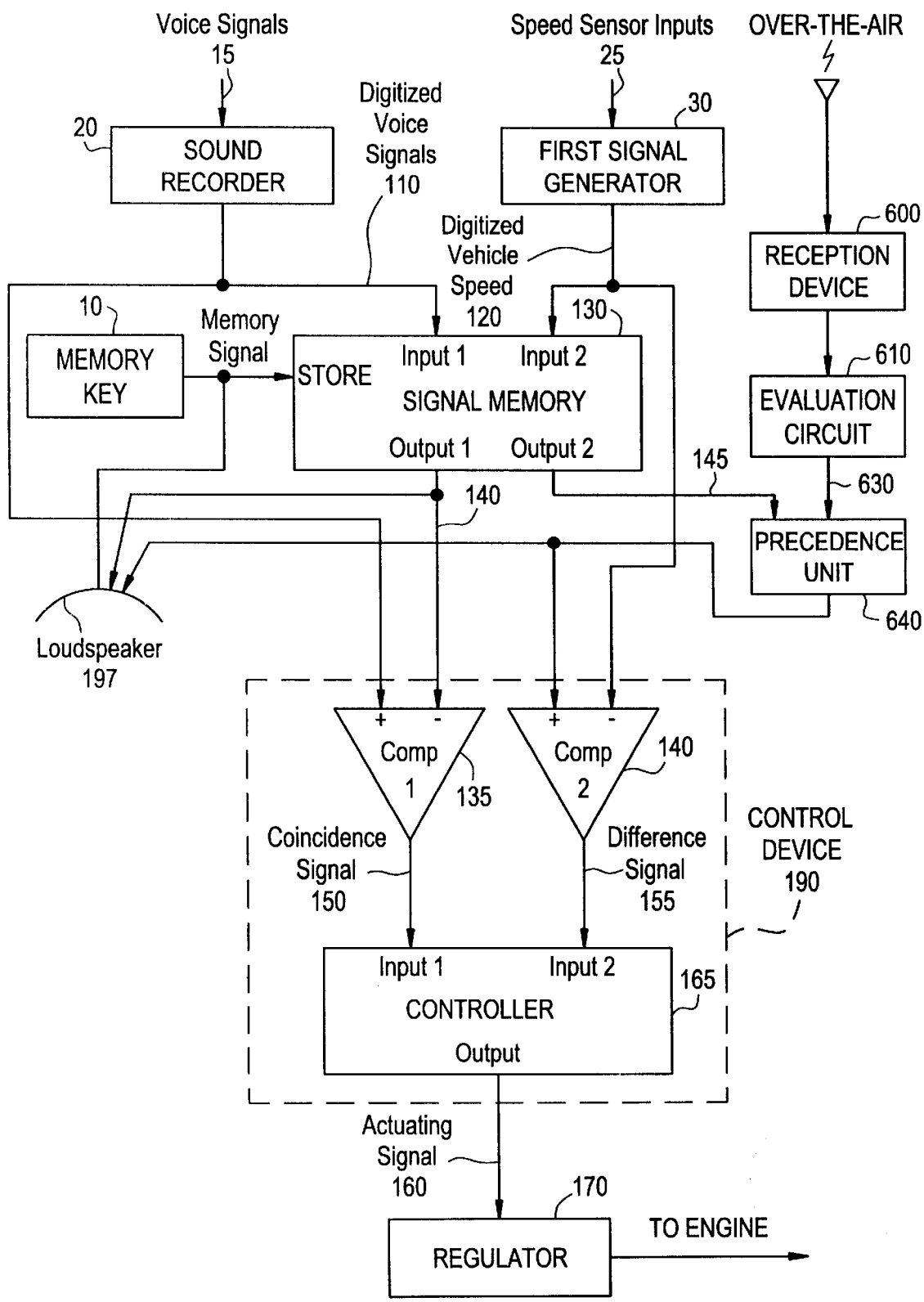
FIG. 6 is a block diagram of an apparatus according to still another embodiment of the invention.

By means of an eighteenth embodiment of the apparatus according to the invention, speed restrictions can be transmitted to the apparatus even from outside the automobile. This avoids the need for the vehicle driver to have to detect visually speed restrictions occurring unexpectedly and to enter them into the apparatus during travel. In this embodiment, a reception device, such as reception device 600 in FIG. 6, receives external control signals that provide the speed limit for a particular region. An evaluation circuit 610 receives the control signals from the reception device 600, and converts those signals into a limit value signal 630. The limit value signal 630 is supplied to the second comparator 140, and takes precedence over any limit value signals provided via line 145 to the second comparator 140. A precedence unit 640 provides for the sending of the limit value signal 630 instead of the limit value signal 145 when external control signals are being received by the reception device 600. This can afford great alleviation, above all when exactly a traffic situation demanding the full attention of the automobile driver prevails at the location in question. This may be the case both with regard to a speed restriction set up constantly and with regard to speed restrictions set up temporarily, such as, for example, on road building sites.

In practice, the apparatus may be used at different design stages. The use of the method is also governed by this. Insofar as alternative designs are specified, they may be used alternatively or, to a limited extent, also in accompaniment with one another. In the last case, it is necessary to ensure that the operation of the apparatus remains as simple as possible and irritation of the vehicle driver is avoided.

I claim:

1. An apparatus for limiting a speed of an automobile, comprising:

a sound recorder configured to receive a voice signal and to digitize the voice signal;

a signal generator configured to receive a speed signal indicative of a current speed of the automobile and to output a digitized speed signal;

a signal memory configured to store the digitized voice signal and the digitized speed signal as a pair of signals when an enable signal is received;

a memory key configured to provide the enable signal to the signal memory, the enable signal being provided when a user operates the memory key;

a first comparator configured to receive the digitized voice signal output from the sound recorder at a first input thereof and a stored digitized voice signal output from the signal memory at a second input thereof, the first comparator configured to compare the digitized voice signal and the stored digitized voice signal and to output a coincidence signal as a result of the comparison;

a second comparator configured to receive the digitized speed signal output from the signal generator at a first input there and a stored digitized speed signal output from the signal memory at a second input thereof, the second comparator configured to compare the digitized speed signal and the stored digitized speed signal and to output a difference signal as a result of the comparison;

a controller configured to receive the coincidence signal and the difference signal, and to output the difference signal as an actuating signal when the coincidence signal indicates coincidence between the digitized voice signal and the stored digitized voice signal; and a regulator configured to receive the actuating signal and to regulate operation of an engine of the automobile based on the actuating signal, wherein the actuating signal regulates the engine of the automobile when the difference signal indicates that the digitized speed signal is greater than the stored digitized speed signal.

2. The apparatus according to claim 1, wherein the memory key allows values to be stored in the signal memory only when the user presses down and holds a button or actuates a key on the memory key.

3. The apparatus according to claim 2, further comprising a speaker configured to receive the memory signal output from the memory key and coupled to an output of the signal memory, wherein the speaker is configured to output as an audible sound the stored digitized speed signal and the stored digitized voice signal when the memory signal is at a first signal level, and to output no signals when the memory signal is at a second signal level.

4. The apparatus according to claim 1, wherein the signal memory is capable of storing a plurality of pairs of signals, for providing a plurality of limit signals for the automobile.

5. The apparatus according to claim 1, further comprising a safety device coupled to the signal memory, the safety device providing for non-erasure and non-overwriting of contents stored in the signal memory when the safety device is actuated.

6. The apparatus according to claim 1, further comprising a manually actuable signal generator, the manually actuable signal generator providing for storage of at least one predetermined speed signal that is indicative of a predetermined speed of the automobile, wherein the manually actuable signal generator provides the at least predetermined speed signal to the signal memory upon actuation of the manually actuable signal generator.

7. The apparatus according to claim 6, wherein, when more than one predetermined speed signal is stored in the manually actuable signal generator, a user is capable of selecting one of the predetermined speed signals to be sent to the signal memory.

8. The apparatus according to claim 7, further comprising a safety device coupled to the manually actuable signal generator, the safety device providing for non-erasure and non-overwriting of contents stored in the manually actuable signal generator when the safety device is actuated.

9. The apparatus according to claim 1, further comprising an inactivation signal generator configured to disable any signals to be sent to the first and second comparators, wherein the inactivation signal generator receives the memory signal output from the memory key and provides the disabling when the memory signal is at a first level that indicates that data is currently being written into the signal memory.

10. The apparatus according to claim 1, further comprising a setting switch having a plurality of switches respectively configured to disable any signals from being input to the first and second comparators, wherein the setting switch receives the memory signal output from the memory key and provides the disabling when the memory signal is at a first level that indicates that data is currently being written into the signal memory.

11. The apparatus according to claim 1, further comprising:

a storage element configured to receive the stored digitized speed signal from the signal memory at a first time instant and to output the stored digitized speed signal as a delayed signal upon receiving another stored digitized speed signal from the signal memory at a second time instant later in time than the first time instant;

a third comparator for receiving the delayed speed signal output from the storage element and the digitized speed signal output from the signal memory at the second time instant, to compare these signals, and to output a comparison result; and an output device for outputting an alert signal based on the comparison result.

12. The apparatus according to claim 11, wherein the output device includes at least one of a visual display and an audible display.

13. The apparatus according to claim 11, wherein the storage element is a flip-flop.

14. The apparatus according to claim 11, wherein the output device outputs the alert signal only when the comparison result indicates that the delayed speed signal corresponds to a higher automobile speed than the digitized speed signal output from the signal memory at the second time instant.

15. The apparatus according to claim 14, wherein the output device is a speaker which repeatedly outputs an audible version of the digitized speed signal for a predetermined number of times.

16. An apparatus according to claim 1, further comprising an acceleration pedal sensor, wherein, when the acceleration pedal sensor outputs a sensed signal indicative of movement of an acceleration pedal of the automobile in a direction towards an unactuated state of the acceleration pedal, the controller cancels output of the actuating signal irrespective as to a current state of the coincidence signal.

17. An apparatus for limiting a speed of an automobile, comprising:

a sound recorder configured to receive a voice signal and to digitize the voice signal;

a signal generator configured to receive a speed signal indicative of a current speed of the automobile and to output a digitized speed signal;

a signal memory configured to store the digitized voice signal and the digitized speed signal as a pair of signals when an enable signal is received;

a memory key configured to provide the enable signal to the signal memory, the enable signal being provided when a user operates the memory key;

a first comparator configured to receive the digitized voice signal output from the sound recorder at a first input thereof and a stored digitized voice signal output from the signal memory at a second input thereof, the first comparator configured to compare the digitized voice signal and the stored digitized voice signal and to output a coincidence signal as a result of the comparison;

a reception device configured to receive a speed limit signal that is received over-the-air;

an evaluation circuit configured to receive the speed limit signal from the reception device, to evaluate the speed limit signal, and to output an evaluated speed limit signal as a result;

a precedence circuit configured to receive a stored digitized speed signal output from the signal memory at a first input thereof and the evaluated speed limit signal at a second input thereof, and to provide a precedence function in which, when both the evaluated speed limit signal and the stored digitized speed signal are received at the same time, only the evaluated speed limit signal is output, and when only the stored digitized speed signal is received, the stored digitized speed signal is output;

a second comparator configured to receive the digitized speed signal output from the signal generator at a first input there and the output of the precedence circuit at a second input thereof, the second comparator configured to perform a comparison of the signals at the first and second inputs and to output a difference signal as a result of the comparison;

a controller configured to receive the coincidence signal and the difference signal, and to output the difference signal as an actuating signal when the coincidence signal indicates coincidence between the digitized voice signal and the stored digitized voice signal; and a regulator configured to receive the actuating signal and to regulate operation of an engine of the automobile based on the actuating signal, wherein the actuating signal regulates the engine of the automobile when the difference signal indicates that the digitized speed signal is greater than the other signal being compared by the second comparator.

18. A method for limiting a speed of an automobile, comprising:

a) operating a memory storage key while at a same time uttering a first voice signal indicative of a current speed of the automobile;

b) converting the first voice signal into a first electronic signal;

c) determining a current speed of the automobile at a same time as the step a);

d) converting the current speed of the automobile into a second electronic signal;

e) storing the first electronic signal and a second electronic signal as a signal pair in a memory;

f) uttering a second voice signal indicative of a desired speed of the automobile while not operating the memory storage key;

g) converting the second voice signal into a third electronic signal;

h) comparing the third electronic with all signals currently stored in the memory, and if there is a match, outputting a coincidence signal on a first output port and a corresponding speed signal on a second output port;

i) comparing the corresponding speed signal with a current speed of the automobile that is provided at a same time as the step g), and outputting a difference signal as a result; and j) regulating a speed of the automobile based on the difference signal and the coincidence signal.

19. The method according to claim 18, wherein the comparing step i) compares the second electronic signal with a next-to-most recently outputted speed signal that has been output by the memory, and wherein, based on the comparison made in the comparing step i), an alarm signal is output.

20. The method according to claim 18, further comprising:

k) receiving a speed limit signal that has been provided over-the-air;

l) evaluating the speed limit signal; and m) determining whether the evaluated speed limit signal is less than a most recent output of the memory, and if so, performing the comparing step i) using the evaluated speed limit signal and not the corresponding speed signal output from the memory.

* * * * *